United States Patent
Kohara

(10) Patent No.: US 12,131,649 B2
(45) Date of Patent: Oct. 29, 2024

(54) DRIVING SUPPORTING APPARATUS

(71) Applicant: TOYOTA JIDOSHA KABUSHIKI KAISHA, Toyota (JP)

(72) Inventor: Takahiro Kohara, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 162 days.

(21) Appl. No.: 18/149,912

(22) Filed: Jan. 4, 2023

(65) Prior Publication Data
US 2023/0222918 A1     Jul. 13, 2023

(30) Foreign Application Priority Data
Jan. 11, 2022 (JP) ................. 2022-002204

(51) Int. Cl.
*B60R 11/04* (2006.01)
*G08G 1/00* (2006.01)

(52) U.S. Cl.
CPC ............. *G08G 1/22* (2013.01); *B60R 11/04* (2013.01)

(58) Field of Classification Search
CPC ......... G08G 1/22; G08G 1/167; B60R 11/04; B60W 50/14; B60W 2050/143; B60W 2050/146; B60W 2420/403; B60W 2420/408; B60W 2520/28; B60W 2556/40
USPC ........................................ 340/988
See application file for complete search history.

(56) References Cited

U.S. PATENT DOCUMENTS

| | | | |
|---|---|---|---|
| 9,969,261 B2 | 5/2018 | Kodama | |
| 10,045,173 B1 | 8/2018 | Morimura et al. | |
| 10,106,157 B2 | 10/2018 | Sawada et al. | |
| 10,150,407 B2 | 12/2018 | Takahashi et al. | |
| 10,234,858 B2 * | 3/2019 | Cashler | B60W 30/143 |
| 10,696,297 B2 | 6/2020 | Nguyen Van et al. | |
| 11,001,255 B2 | 5/2021 | Fukuman et al. | |
| 11,110,937 B2 | 9/2021 | Kinoshita et al. | |
| 2014/0368330 A1 * | 12/2014 | Watanabe | G08G 1/16 340/475 |
| 2019/0001968 A1 | 1/2019 | Yorifuji et al. | |

(Continued)

FOREIGN PATENT DOCUMENTS

| | | |
|---|---|---|
| JP | 2007-058631 A | 3/2007 |
| JP | 2007-257228 A | 10/2007 |

(Continued)

*Primary Examiner* — Omar Casillashernandez
(74) *Attorney, Agent, or Firm* — Sughrue Mion, PLLC

(57) ABSTRACT

A driving supporting apparatus comprises a notification device that performs a notification to a driver of a host vehicle; and a control unit capable of causing the notification device to perform an approaching notification to notify the driver that a following vehicle present behind the host vehicle has approached the host vehicle, when the following vehicle satisfies a predetermined approaching condition. The control unit is configured to cause the notification device to perform the approaching notification, when the following vehicle satisfies the approaching condition in a case where an adjacent lane is present, if a permission condition depending on presence or absence of an adjacent vehicle traveling in the adjacent lane is satisfied. The permission condition used when the adjacent vehicle is present has been set to a condition that is harder to be satisfied than a condition set as the permission condition used when the adjacent vehicle is not present.

6 Claims, 10 Drawing Sheets

(56) References Cited

U.S. PATENT DOCUMENTS

| | | | |
|---|---|---|---|
| 2019/0344828 A1 | 11/2019 | Omori et al. | |
| 2019/0389488 A1 | 12/2019 | Yamada et al. | |
| 2020/0062259 A1* | 2/2020 | Huh | B60W 50/0097 |
| 2020/0377102 A1* | 12/2020 | Kuwahara | B60W 40/04 |
| 2021/0221395 A1* | 7/2021 | Uenoyama | B60W 30/16 |
| 2023/0222918 A1* | 7/2023 | Kohara | G08G 1/22 |
| | | | 340/988 |
| 2023/0303067 A1* | 9/2023 | Duan | G08G 1/16 |
| 2023/0311740 A1* | 10/2023 | Kunii | B60Q 1/34 |
| | | | 362/538 |
| 2023/0347926 A1* | 11/2023 | Hayakawa | G08G 1/052 |

FOREIGN PATENT DOCUMENTS

| | | |
|---|---|---|
| JP | 2012-048346 A | 3/2012 |
| JP | 2016-177465 A | 10/2016 |
| JP | 2017-129980 A | 7/2017 |
| JP | 2021-114110 A | 8/2021 |

\* cited by examiner

| SCENE | ADJACENT VEHICLE | PRECEDING VEHICLE | PERMISSION CONDITION |
|---|---|---|---|
| 1 | NOT PRESENT | NOT PRESENT | SATISFIED |
| 2 | NOT PRESENT | PRESENT | SATISFIED |
| 3 | PRESENT | NOT PRESENT | SATISFIED |
| 4 | PRESENT | PRESENT | UNSATISFIED |

FIG.3

DRIVING SUPPORTING APPARATUS

TECHNICAL FIELD

The present disclosure relates to a driving supporting/assistance apparatus configured to perform an approaching notification to notify a driver of a host vehicle of an approach of a following vehicle (vehicle behind) of the host vehicle, when the following vehicle satisfies a predetermined approaching condition (coming-closer condition).

BACKGROUND

There has been a known driving supporting apparatus configured to perform the approaching notification when the following vehicle has approached (come close to) the host vehicle.

For example, a driving supporting apparatus (hereinafter, referred to as a "conventional apparatus") disclosed in Japanese Patent Application Laid-Open No. 2017-129980 performs the approaching notification, when the following vehicle has approached (come close to) the host vehicle in a case where the host vehicle is traveling in a "passing lane for passing/overtaking an other vehicle". Whereas, the conventional apparatus does not perform the approaching notification, when the following vehicle has approached (come close to) the host vehicle in a case where the host vehicle is traveling in a "cruising lane for usual driving". In such a case, the following vehicle generally changes lanes to pass the host vehicle, and therefore, the host vehicle does not have to take any actions for the following vehicle. If the approaching notification is performed in such a case, the driver may feel annoyed. This is why the conventional apparatus does not perform the approaching notification in such a case.

In addition, the conventional apparatus does not perform the approaching notification, when the following vehicle has approached (come close to) the host vehicle in a case where the host vehicle is traveling in the passing lane and a preceding vehicle ahead of the host vehicle is present. This is because, in this scene, it is supposed that the host vehicle does not have to change lanes, since the following vehicle could not pass the preceding vehicle even if the host vehicle changes lanes.

SUMMARY

However, even in the case where the host vehicle is traveling in the passing lane and the preceding vehicle is present, it may be desirable that the approaching notification be performed, because the following two effects are expected when the host vehicle changes lanes due to the approaching notification.

A possibility that a driver of the following vehicle feels stress about the host vehicle can be decreased.

If the number of vehicles, each having the driving support apparatus configured to perform the approaching notification in the above-described case, increases, a possibility that a traffic congestion occurs can be decreased.

In view of the above, it is desirable that the approaching notification be performed even when the preceding vehicle is present. However, if the approaching notification is performed when the host vehicle cannot change lanes, the driver of the host vehicle may feel annoyed by the approaching notification.

The present disclosure is made to cope with the problem described above. That is, one of objectives of the present disclosure is to provide a driving supporting apparatus capable of decreasing a possibility that the approaching notification is performed when the host vehicle cannot change lanes, so as to decrease a possibility that the driver feels annoyed by the approaching notification.

The driving supporting apparatus (hereinafter, referred to as a "present disclosure apparatus") according to the present disclosure comprises:

a notification device (31, 32) that performs a notification to a driver of a host vehicle (SV); and a control unit (20) capable of causing the notification device to perform an approaching notification to notify the driver that a following vehicle present behind the host vehicle has approached the host vehicle, when the following vehicle satisfies a predetermined approaching condition (step 610; Yes).

The control unit is configured to cause the notification device to perform the approaching notification (step 630), when the following vehicle satisfies the approaching condition (step 610: Yes) in a case where an adjacent lane (NL) is present (step 615: No), the adjacent lane being a lane that is adjacent to a host lane (SL) in which the host vehicle is traveling and that permits vehicles to travel in the same direction as a direction in which the host lane permits vehicles to travel, if a permission condition depending on presence or absence of an adjacent vehicle traveling in the adjacent lane is satisfied (step 625, step 635).

The permission condition used when the adjacent vehicle is present has been set to a condition that is harder to be satisfied than a condition set as the permission condition used when the adjacent vehicle is not present.

A possibility that the host vehicle cannot change lanes is higher when the adjacent is present than when the adjacent vehicle is not present. Thus, in the present disclosure apparatus, the permission condition has been set in such a manner that a possibility that the permission condition of when the adjacent vehicle is present is satisfied is lower than a possibility that the permission condition of when the adjacent vehicle is not present is satisfied. This can decrease the possibility that the approaching notification is performed when the host vehicle cannot change lanes, and thus, decrease the possibility that the driver feels annoyed by the approaching notification.

In some embodiments, the permission condition has been set in such a manner that:

the permission condition is satisfied regardless of whether or not a preceding vehicle in front of the host vehicle is present, if the adjacent vehicle is not present (step 625: Yes), and the permission condition is satisfied when the preceding vehicle is not present (step 635: No) if the adjacent vehicle is present (step 625: No), and the permission condition is not satisfied when the preceding vehicle is present (step 635: Yes) if the adjacent vehicle is present (step 625: No).

Even when the adjacent vehicle is present, the driver of the host vehicle can accelerate the host vehicle, as an action for the following vehicle, if the preceding vehicle is not present. In view of this, in the above embodiment, the approaching notification is performed when the adjacent vehicle is present and the preceding vehicle is not present. Whereas, when the adjacent vehicle is present and the preceding vehicle is present, the driver of the host vehicle cannot take any actions for the following vehicle. In view of this, in the above embodiment, the approaching notification is not performed when the adjacent vehicle is present and the preceding vehicle is present. Therefore, a possibility that the approaching notification is performed when the driver of the host vehicle cannot take any actions for the following vehicle, and thus, the possibility that the driver feels annoyed by the approaching notification can be decreased. Furthermore, since a possibility that the approaching notification is performed when the driver of the host vehicle can take an action for the following vehicle can be increased, a possibility that a driver of the following vehicle feels stress about the host vehicle can be decreased, and a possibility that a traffic congestion occurs can be decreased.

In the above embodiment, the control unit is configured to, when the adjacent vehicle is not present (step 625 shown in FIG. 7: No) and the preceding vehicle is not present (step 705: No) in a case where the permission condition is satisfied, differentiate (step 630 shown in FIG. 7, step 715) between a manner of the approaching notification of when a vehicle speed indicative of a speed of the host vehicle is higher than a predetermined vehicle speed threshold (step 710: No) and a manner of the approaching notification of when the vehicle speed is equal to or lower than the vehicle speed threshold (step 710: Yes).

In the above embodiment, the control unit is configured to, when neither the adjacent vehicle nor the preceding vehicle is present in the case where the permission condition is satisfied (step 625 shown in FIG. 7: No, step 705: No):

cause the notification device to perform, as the approaching notification, a lane change notification having a manner to urge the driver to change lanes to the adjacent lane (step 715), when the vehicle speed is higher than the vehicle speed threshold (step 710: No); and cause the notification device to perform, as the approaching notification, a notification having a manner to notify the driver that the following vehicle has approached (step 630 shown in FIG. 7), when the vehicle speed is equal to or lower than the vehicle speed threshold (step 710: Yes).

When the adjacent vehicle is not present and the preceding vehicle is not present, the driver of the host vehicle can take one of two actions described below, for the following vehicle.

Causing the host vehicle to change lanes.

Accelerating the host vehicle.

Here, it is likely that it is inappropriate to accelerate the host vehicle, as the action with respect to the following vehicle, when the vehicle speed is higher than the speed threshold.

According to the above embodiment, the lane change notification is performed when the vehicle speed is higher than the speed threshold. Thus, the driver of the host vehicle can take an appropriate action with respect to the following vehicle without dithering what to do.

In the above embodiment, the control unit is configured to, when the preceding vehicle is not present in a case where the permission condition is satisfied (step 705 shown in FIG. 8: No, step 635 shown in FIG. 8; No), cause the notification device to perform, as the approaching notification, an acceleration notification having a manner to urge the driver to accelerate the host vehicle (step 805), when a vehicle speed indicative of a speed of the host vehicle is equal to or lower than a predetermined vehicle speed threshold (step 710 shown in FIG. 8: Yes, step 810: Yes).

The acceleration notification is performed when the preceding vehicle is not present and the vehicle speed is equal to or lower than the vehicle speed threshold. Therefore, the possibility that the driver of the host vehicle can take an appropriate action with respect to the following vehicle can be increased.

In some embodiment, the control unit is configured to determine that the approaching condition becomes satisfied, when a distance between the host vehicle and the following vehicle becomes equal to or shorter than a predetermined distance threshold (step 610: Yes), or when a time length predicted for the following vehicle to collide with the host vehicle becomes equal to or shorter than a predetermined time threshold.

This can cause the approaching condition to become satisfied when the following vehicle has approached the host vehicle, and thus, can decrease a possibility that the approaching notification is performed when the following vehicle has not yet approached the host vehicle.

Notably, in the above description, in order to facilitate understanding of the present disclosure, the constituent elements or the like of the disclosure corresponding to those of the embodiments of the disclosure which will be described later are accompanied by parenthesized names and/or symbols which are used in the embodiments. However, the constituent elements of the disclosure should not be limited to those in the embodiments defined by the names and/or the symbols. Other objects, other features, and attendant advantages of the present disclosure will be readily appreciated from the following description of the embodiment of the disclosure which is made with reference to the accompanying drawings.

BRIEF DESCRIPTION OF THE DRAWINGS

FIG. 3 is a drawing for describing a permission condition.

DETAILED DESCRIPTION

<Configuration>

Figure 1:
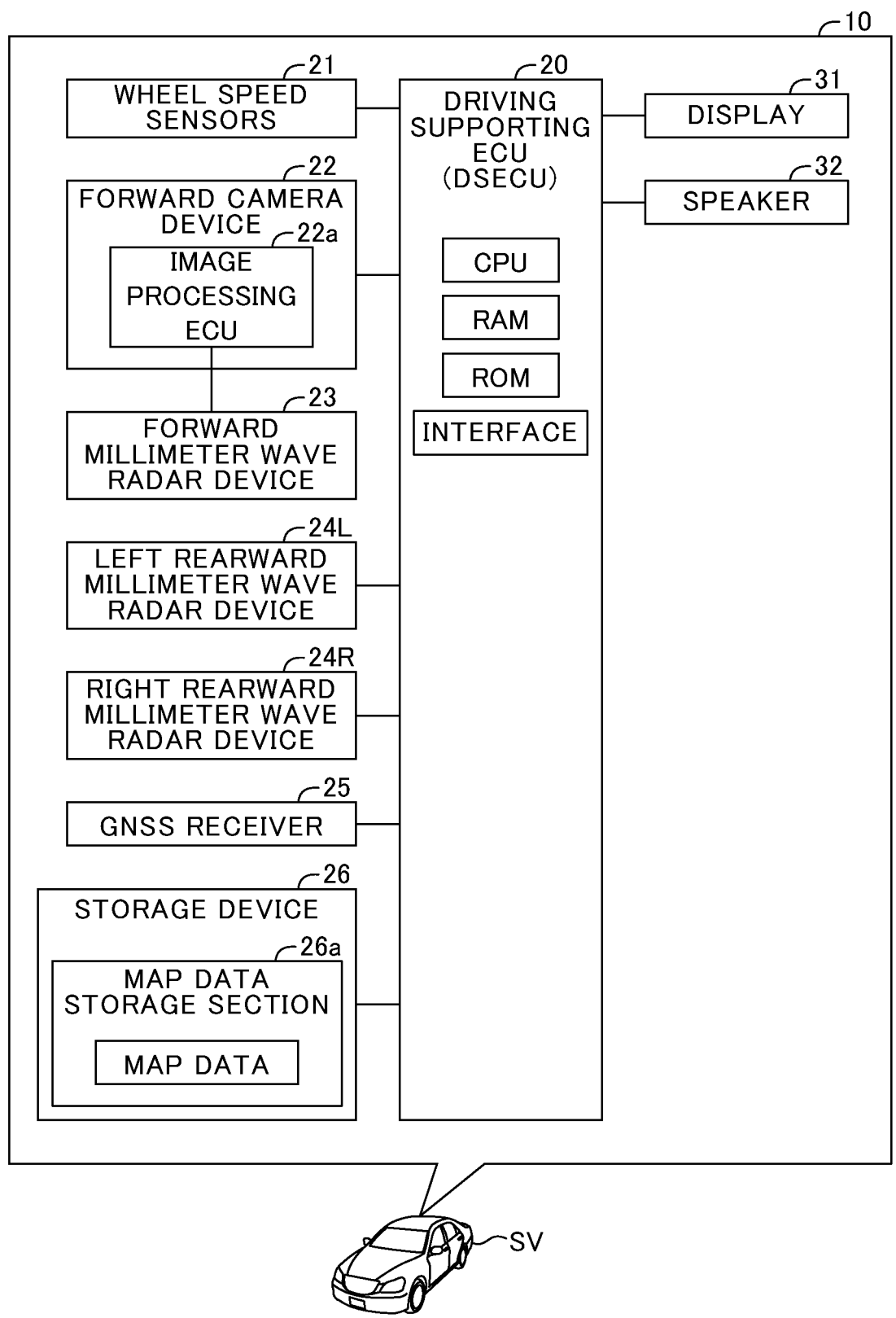
FIG. 1 is a schematic system diagram of a driving supporting apparatus according to an embodiment of the present disclosure.

As shown in FIG. 1, a driving supporting apparatus 10 according to an embodiment of the present disclosure is applied to (or installed in) a vehicle (hereinafter, referred to as a "host vehicle") SV.

The driving supporting apparatus 10 comprises a driving supporting ECU 20 (hereinafter, referred to as a "DSECU 20").

An "ECU" is an abbreviation of an "Electronic Control Unit" that is an electronic control circuit including a microcomputer as a main component. The microcomputer includes a CPU, a ROM, a RAM, and an interface (I/F). The ECU may sometimes be referred to as a "control unit", a "controller", or a "computer". The CPU is configured and/or programmed to realize various functions by executing instructions (routines/programs) stored in a memory (the ROM). Functions realized by a single ECU can be achieved by a plurality of ECUs.

The driving supporting apparatus 10 comprises wheel speed sensors 21, a forward camera device 22, a forward millimeter wave radar device 23, a left rearward millimeter wave radar device 24L, a right rearward millimeter wave radar device 24R, a GNSS (Global Navigation Satellite System) receiver 25, a storage device 26, a display 31, and a speaker 32. The devices other than the forward millimeter wave radar device 23 are connected with the DSECU 20 so as to be able to mutually exchange data with the DSECU 20.

The wheel speed sensors 21 are provided to respective wheels of the host vehicle SV. Each of the wheel speed sensors 21 generates one wheel pulse signal when the corresponding wheel rotates by a predetermined angle. The DSECU 20 counts the number of the wheel pulse signal generated by each of the wheel speed sensors 21 per unit time, and obtains a wheel rotational speed of each of the wheels based on the counted number. The DSECU 20 obtains a vehicle speed Vs indicative of a moving speed of the host vehicle SV based on the wheel rotational speeds of the wheels. For instance, the DSECU 20 obtains an average of the wheel speeds of four of the wheels as the vehicle speed Vs.

Figure 2:
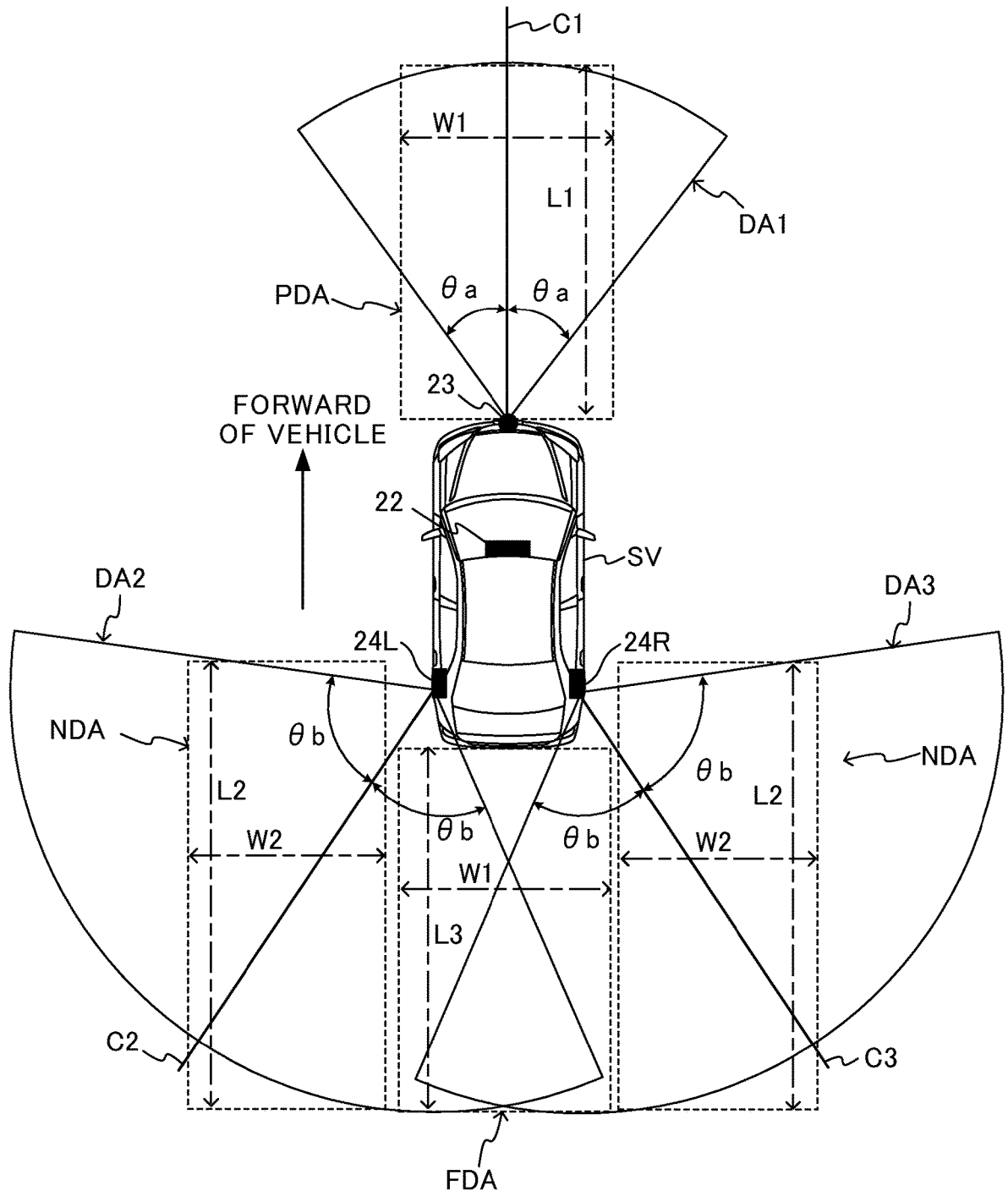
FIG. 2 is a drawing for describing a detection area of each millimeter wave radar device shown in FIG. 1.

As shown in FIG. 2, the frontward camera device 22 is arranged at an upper and central part of a front windshield and inside a cabin of the host vehicle SV. The frontward camera device 22 obtains/captures an image (hereinafter, referred to as a "camera image") of a predetermined area in front of (or ahead of) the host vehicle SV every time a predetermined time elapses.

The frontward millimeter wave radar device 23 is arranged at a position in the vicinity of a lateral center of a front end of the host vehicle SV. The frontward millimeter wave radar device 23 radiates/transmits a millimeter wave that propagates in a predetermined detection area DA1 ahead of (in front of) the host vehicle SV (refer to FIG. 2). The millimeter wave is reflected from (by) a three dimensional object (object) including a vehicle other than the host vehicle SV, a pedestrian, and a two wheels. The frontward millimeter wave radar device 23 receives the reflected wave, and obtains radar object information based on the received reflected wave. The radar object information includes a reception result of the reflected wave (power spectrum data of the reflected wave), a distance to the object, a lateral position of the object, and a relative speed Vr of the object with respect to the host vehicle SV.

The detection area DA1 is an area that has a predetermined angle θa leftward from a "center axis C1 extending forward of the host vehicle SV from the frontward millimeter wave radar device 23" and has the angle θa rightward from the center axis C1. The detection area DA1 is within a maximum detection distance from the millimeter wave radar device 23.

The forward camera device 22 includes an image processing ECU 22a. The image processing ECU 22a recognizes an object located/present in front of the host vehicle SV based on the camera image and "the reception result of the reflected wave included in the radar object information", and obtains a distance to the object and a lateral position of the object. Thereafter, the image processing ECU 22a transmits object information which includes a distance D to the object, a lateral position of the object, a relative speed Vr of the object to the DSECU 20. The relative speed Vr has a positive value when the object is approaching (coming closer to) the host vehicle SV.

Furthermore, the image processing ECU 22a recognizes a partition line (lane marker) on a road based on the camera image to obtain partition line information, and transmits the partition line information to the DSECU 20. The partition line information includes information on a position with respect to the host vehicle SV, and information indicative of whether the partition line is a solid line or a broken line.

As shown in FIG. 2, the driving supporting apparatus 10 has/sets a preceding vehicle detection area PDA located frontward (in front) of the host vehicle SV. The driving supporting apparatus 10 recognizes, based on the object information, a "vehicle located/present in the preceding vehicle detection area PDA" as a "preceding vehicle PV". The preceding vehicle PV is a vehicle located in front of the host vehicle SV. The preceding vehicle detection area PDA has a rectangular shape having a predetermined width W1, and a predetermined length L1 forward of the host vehicle SV from the front end of the host vehicle SV. The width W1 of the preceding vehicle detection area PDA has been set to a value obtained by adding a vehicle width of the host vehicle SV to a predetermined margin. The length L1 of the preceding vehicle detection area PDA has been set to an appropriate/given value.

As shown in FIG. 2, the left rearward millimeter wave radar device 24L is arranged at a rear left side of the host vehicle SV. The left rearward millimeter wave radar device 24L radiates/transmits a millimeter wave that propagates in a predetermined detection area DA2 rear leftward of the host vehicle SV (refer to FIG. 2), and receives its reflected wave so as to obtain the above-described radar object information. The left rearward millimeter wave radar device 24L transmits the thus obtained radar object information to the DSECU 20.

The detection area DA2 is an area that has a predetermined angle θb leftward from a "center axis C2 extending rear leftward of the host vehicle SV from the left rearward millimeter wave radar device 24L" and has the angle θb rightward from the center axis C2. The detection area DA2 is within a maximum detection distance from the left rearward millimeter wave radar device 24L.

As shown in FIG. 2, the driving supporting apparatus 10 has/sets a leftward adjacent vehicle detection area NDAL located rear leftward of the host vehicle SV. The leftward adjacent vehicle detection area NDAL has a rectangular shape having a predetermined width W2 and a predetermined length L2. The driving supporting apparatus 10 recognizes, based on the radar object information from the left rearward millimeter wave radar device 24L, a "vehicle located/present in the leftward adjacent vehicle detection area NDAL" as an "adjacent vehicle NV". The adjacent vehicle NV is a vehicle traveling in an adjacent lane NL (refer to FIGS. 4A to 5B), and is a vehicle with which the host vehicle may collide when the host vehicle SV changes lanes.

The adjacent lane NL is a lane adjacent (next) to a host lane SL (refer to FIGS. 4A to 5B) that is a lane in which the host vehicle SV is traveling. The adjacent lane NL permits vehicles to move/travel in the same direction as a direction in which the host lane SL permits vehicles to move/travel.

It should be noted that the driving supporting apparatus 10 recognizes, based on the reception result included in the radar object information, an object as a vehicle, the object having a power of the reflected wave that is equal to or greater than a threshold.

As shown in FIG. 2, the right rearward millimeter wave radar device 24R is arranged at a rear right side of the host vehicle SV. The right rearward millimeter wave radar device 24R radiates/transmits a millimeter wave that propagates in a predetermined detection area DA3 rear rightward of the host vehicle SV (refer to FIG. 2), and receives its reflected wave so as to obtain the above-described radar object information. The right rearward millimeter wave radar device 24R transmits the thus obtained radar object information to the DSECU 20.

The detection area DA3 is an area that has the predetermined angle θb leftward from a "center axis C3 extending rear rightward of the host vehicle SV from the right rearward millimeter wave radar device 24R" and has the angle θb rightward from the center axis C3. The detection area DA3 is within a maximum detection distance from the right rearward millimeter wave radar device 24R.

As shown in FIG. 2, the driving supporting apparatus 10 has/sets a rightward adjacent vehicle detection area NDAR located rear rightward of the host vehicle SV. The rightward adjacent vehicle detection area NDAR has a rectangular shape having a predetermined width W2 and a predetermined length L2. The driving supporting apparatus 10 recognizes, based on the radar object information from the right rearward millimeter wave radar device 24R, a "vehicle located/present in the rightward adjacent vehicle detection area NDAR" as the "adjacent vehicle NV".

It should be noted the width W2 of the rightward adjacent vehicle detection area NDAR may be equal to or different from the width W2 of the leftward adjacent vehicle detection area NDAL. The length L2 of the rightward adjacent vehicle detection area NDAR may be equal to or different from the length L2 of the leftward adjacent vehicle detection area NDAL.

Furthermore, the driving supporting apparatus 10 has/sets a following vehicle detection area FDA located rearward and around a rear center of the host vehicle SV (namely, between the leftward adjacent vehicle detection area NDAL and the rightward adjacent vehicle detection area NDAR). The driving supporting apparatus 10 recognizes, based on the object information from the left rearward millimeter wave radar device 24L and the right rearward millimeter wave radar device 24R, a "vehicle located/present in the following vehicle detection area FDA" as a "following vehicle FV". The following vehicle FV is a vehicle located rearward of (behind) the host vehicle SV.

The following vehicle detection area FDA has a rectangular shape having a predetermined width W1, and a predetermined length L3 rearward of the host vehicle SV from the rear end of the host vehicle SV. The length L3 of the following vehicle detection area FDA has been set to an appropriate/given value. The width W1 of the following vehicle detection area FDA may be equal to or different from the width W1 of the preceding vehicle detection area PDA.

The GNSS receiver 25 and the storage device 26, both shown in FIG. 1, are used in a third modification described later.

The display 31 is arranged at a position in the cabin of the host vehicle which the driver sitting in a driver's seat can visibly recognize. For instance, the display 31 may be a meter display, a HUD (head up display), an electronic rearview mirror, or a multimedia display.

When the display 31 receives an approaching notification instruction, the display 31 displays an approaching notification image. The approaching notification image is for notifying the driver of the host vehicle SV of the approach of the following vehicle FV (for notifying the driver of the host vehicle SV that the following vehicle FV has approached (or come close to) the host vehicle SV).

The speaker 32 is used in a sixth modification described later.

(Outline of Operation)

The driving supporting apparatus 10 is configured to perform the approaching notification by causing the display 31 to display the approaching notification image, when a predetermined approaching condition becomes satisfied and a predetermined permission condition is satisfied in a case in which the adjacent lane NL is present.

The approaching condition is a condition to be satisfied when the following vehicle FV has approached (come close to) the host vehicle SV. For example, the approaching condition becomes satisfied when a distance D between the host vehicle SV and the following vehicle FV becomes equal to or shorter than a distance threshold Dth.

The permission condition will next be described with reference to FIG. 3. The permission condition varies depending on (or includes a condition regarding) presence or absence of the adjacent vehicle NV.

In a case where the adjacent vehicle NV is not present, the permission condition is always satisfied regardless of presence or absence of the preceding vehicle PV (i.e., regardless of whether or not the preceding vehicle PV is present) (refer to a scene 1 and a scene 2, shown in FIG. 3).

Whereas, in a case where the adjacent vehicle NV is present, the permission condition is satisfied only when the preceding vehicle PV is not present (refer to a scene 3 shown in FIG. 3), and is not satisfied when the preceding vehicle PV is present (refer to a scene 4 shown in FIG. 3).

When the adjacent vehicle NV is present and the preceding vehicle PV is not present, the driver can not cause the host vehicle SV to change lanes because of the presence of the adjacent vehicle NV, but can accelerate the host vehicle since the preceding vehicle PV is not present. Whereas, when the adjacent vehicle NV is present and the preceding vehicle PV is also present, the driver can neither cause the host vehicle SV to change lanes nor accelerate the host vehicle SV (in other words, the driver cannot take any actions with respect to the following vehicle FV).

If the approaching notification is performed even though the driver cannot take any actions with respect to the following vehicle FV, it is highly likely that the driver feels annoyed by the notification. When the adjacent vehicle NV is present, the driver cannot cause the host vehicle SV to change lanes. Thus, the permission condition used when the adjacent vehicle NV is present has been set to a condition that is harder to be satisfied than a condition set as the permission condition used when the adjacent vehicle NV is not present (i.e., in such a manner that a possibility that the permission condition of when the adjacent vehicle NV is present is satisfied is lower than a possibility that the permission condition of when the adjacent vehicle NV is not present is satisfied). More specifically, as described above, in the case where the adjacent vehicle NV is not present, the permission condition is always satisfied regardless of presence or absence of the preceding vehicle PV. Whereas, in the case where the adjacent vehicle NV is present, the permission condition is satisfied only when the preceding vehicle PV is not present.

By means of the above (i.e., by setting the permission condition as described above), the possibility that the approaching notification is performed when the driver cannot take any actions with respect to the following vehicle FV can be decreased. Therefore, the possibility that the driver is annoyed by the approaching notification can be decreased.

(Example of Operation)

An example of operation of the driving supporting apparatus 10 under a scene 1 (where neither the adjacent vehicle NV nor the preceding vehicle PV is present) shown in FIG. 3 will be described, with reference to FIG. 4A.

The driving supporting apparatus 10 determines, based on the radar object information sent from the rearward millimeter wave radar devices 24L and 24R, whether or not the following vehicle FV is present. When the following vehicle FV is present, the driving supporting apparatus 10 determines, based on the radar object information, whether or not the following vehicle FV satisfies the above-described approaching condition.

When the following vehicle FV satisfies the above-described approaching condition, the driving supporting apparatus 10 determines, based on the partition line information, whether or not the host lane is a single lane. More specifically, the driving supporting apparatus 10 determines that the host lane is a single lane, when both of a left partition line and a right partition line of the host lane SL are solid lines. Whereas, when at least one of the left partition line and the right partition line of the host lane SL is a broken line, the driving supporting apparatus 10 determines that the host lane is not a single lane, but determines that the adjacent lane NL is present.

Figure 4A:
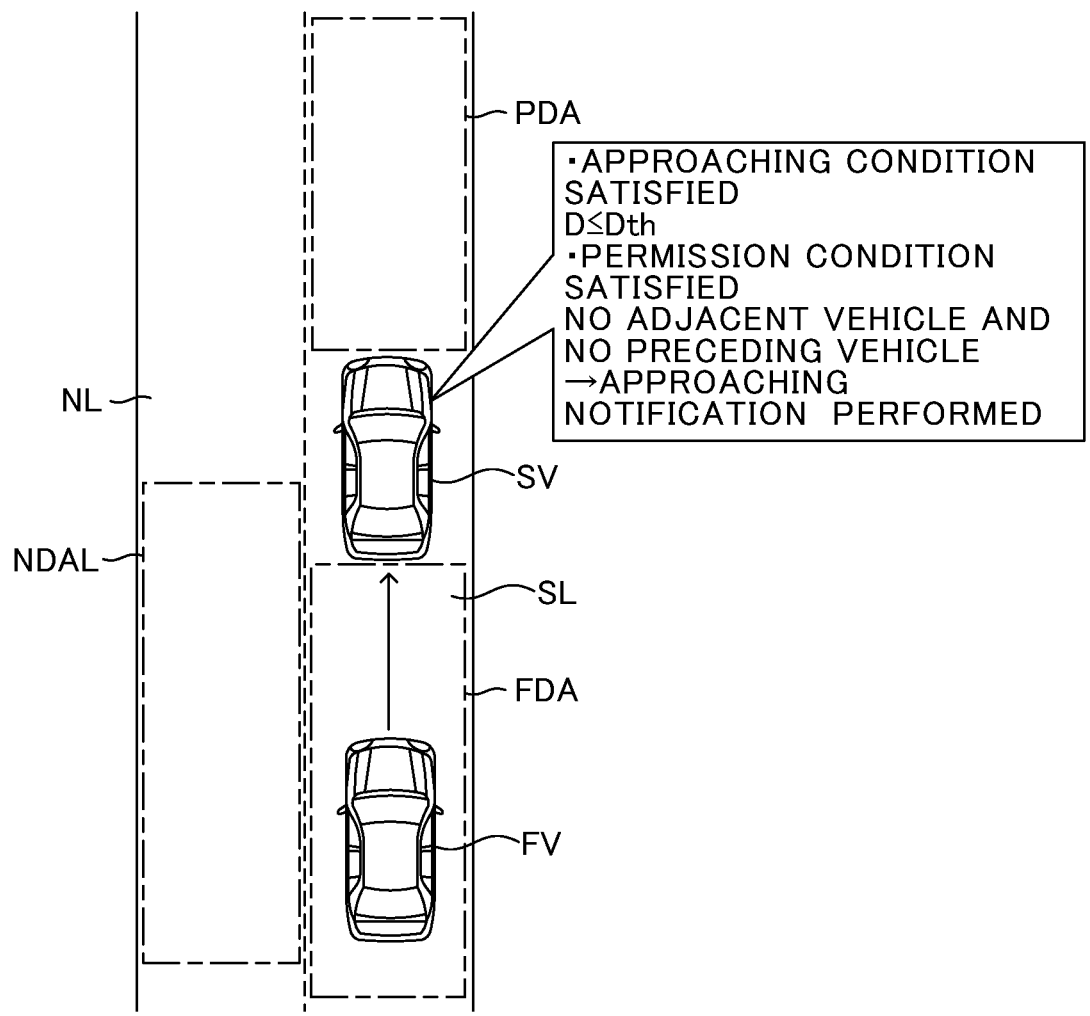
FIG. 4A is a drawing for describing an operation of the driving supporting apparatus, when an adjacent vehicle is not present and a preceding vehicle is not present.

In the example shown in FIG. 4A, since the left line of the host lane SL is a broken line, the driving supporting apparatus 10 determines that the host lane is not a single lane. In this case, the driving supporting apparatus 10 determines, based on the partition line information, whether or not the host lane SL is a passing lane.

More specifically, when the left partition line of the host lane SL is a broken line and the right partition line of the host lane SL is a solid line, the driving supporting apparatus 10 determines that the host lane SL is a passing lane. When the right partition line of the host lane SL is a broken line and the left partition line of the host lane SL is a solid line, and when both of the left partition line of the host lane SL and the right partition line of the host lane SL are broke lines, the driving supporting apparatus 10 determines that the host lane SL is a cruising lane.

It should be noted that, in a country where a vehicle must keep right according to a traffic regulation, the driving supporting apparatus 10 determines that the host lane SL is a passing lane when the right partition line of the host lane SL is a broken line and the left partition line of the host lane SL is a solid line.

In the example shown in FIG. 4A, since the left line of the host lane SL is a broken line and the right line of the host lane SL is a solid line, the driving supporting apparatus 10 determines that the host lane SL is a passing lane. In this case, the driving supporting apparatus 10 determines whether or not the adjacent vehicle NV is present. More specifically, the driving supporting apparatus 10 determines, based on the radar object information sent from the rearward millimeter wave radar device 24L, whether or not a vehicle is present in the leftward adjacent vehicle detection area NDAL.

In a country where a vehicle must keep left according to a traffic regulation, when the host vehicle SV is traveling in the passing lane as shown in FIG. 4A, the host vehicle SV never changes lanes to a lane in the right side of the host lane SL from the host lane SL. Therefore, even if a vehicle is present in the rightward adjacent vehicle detection area NDAR, the driving supporting apparatus 10 does not regard that vehicle as the adjacent vehicle NV.

It should be noted that, in the country where a vehicle must keep right, the driving supporting apparatus 10 determines, based on the radar object information sent from the rearward millimeter wave radar device 24R, whether or not a vehicle is present in the rightward adjacent vehicle detection area NDAR. The driving supporting apparatus 10 regards a vehicle present in the rightward adjacent vehicle detection area NDAR as the adjacent vehicle NV, but does not regard a vehicle present in the leftward adjacent vehicle detection area NDAL as the adjacent vehicle NV.

In the example shown in FIG. 4A, no vehicle is present in the leftward adjacent vehicle detection area NDAL (namely, the adjacent vehicle NV is not present). In this case, the driving supporting apparatus 10 determines that the permission condition becomes satisfied, and performs the approaching notification.

It should be noted that, in the example shown in FIG. 4A, no other vehicle is present in the preceding vehicle detection area PDA set in front of the host vehicle SV, and thus, the preceding vehicle PV is not present.

An example of operation of the driving supporting apparatus 10 under a scene 2 (where the adjacent vehicle NV is not present, but the preceding vehicle PV is present) shown in FIG. 3 will be described, with reference to FIG. 4B.

Figure 4B:
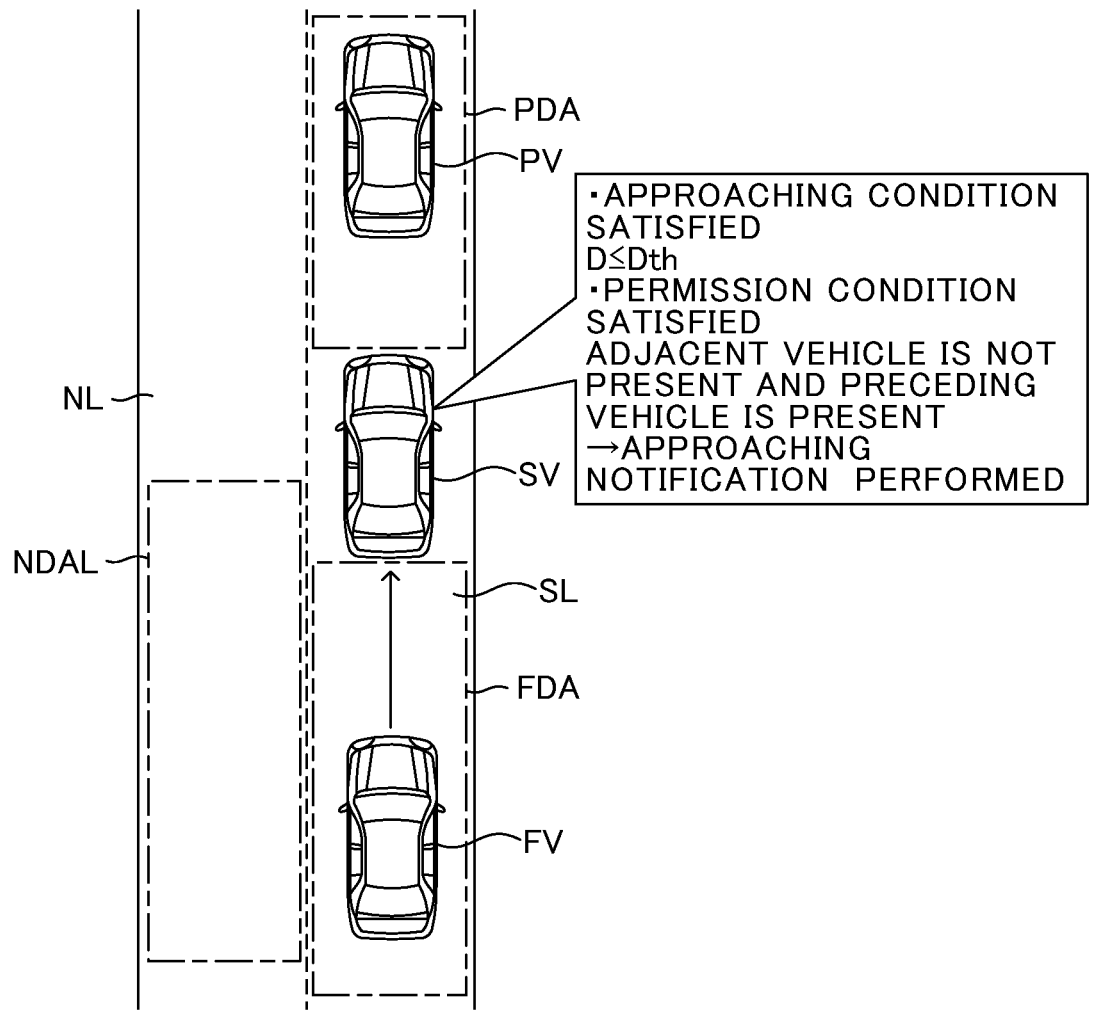
FIG. 4B is a drawing for describing an operation of the driving supporting apparatus, when the adjacent vehicle is not present and the preceding vehicle is present.

In the example shown in FIG. 4B, a vehicle (preceding vehicle PV) is present in the preceding vehicle detection area PDA, but the adjacent vehicle NV is not present. Thus, the driving supporting apparatus 10 determines that the permission condition becomes satisfied, and performs the approaching notification.

An example of operation of the driving supporting apparatus 10 under a scene 3 (where the adjacent vehicle NV is present, but the preceding vehicle PV is not present) shown in FIG. 3 will be described, with reference to FIG. 5A.

Figure 5A:
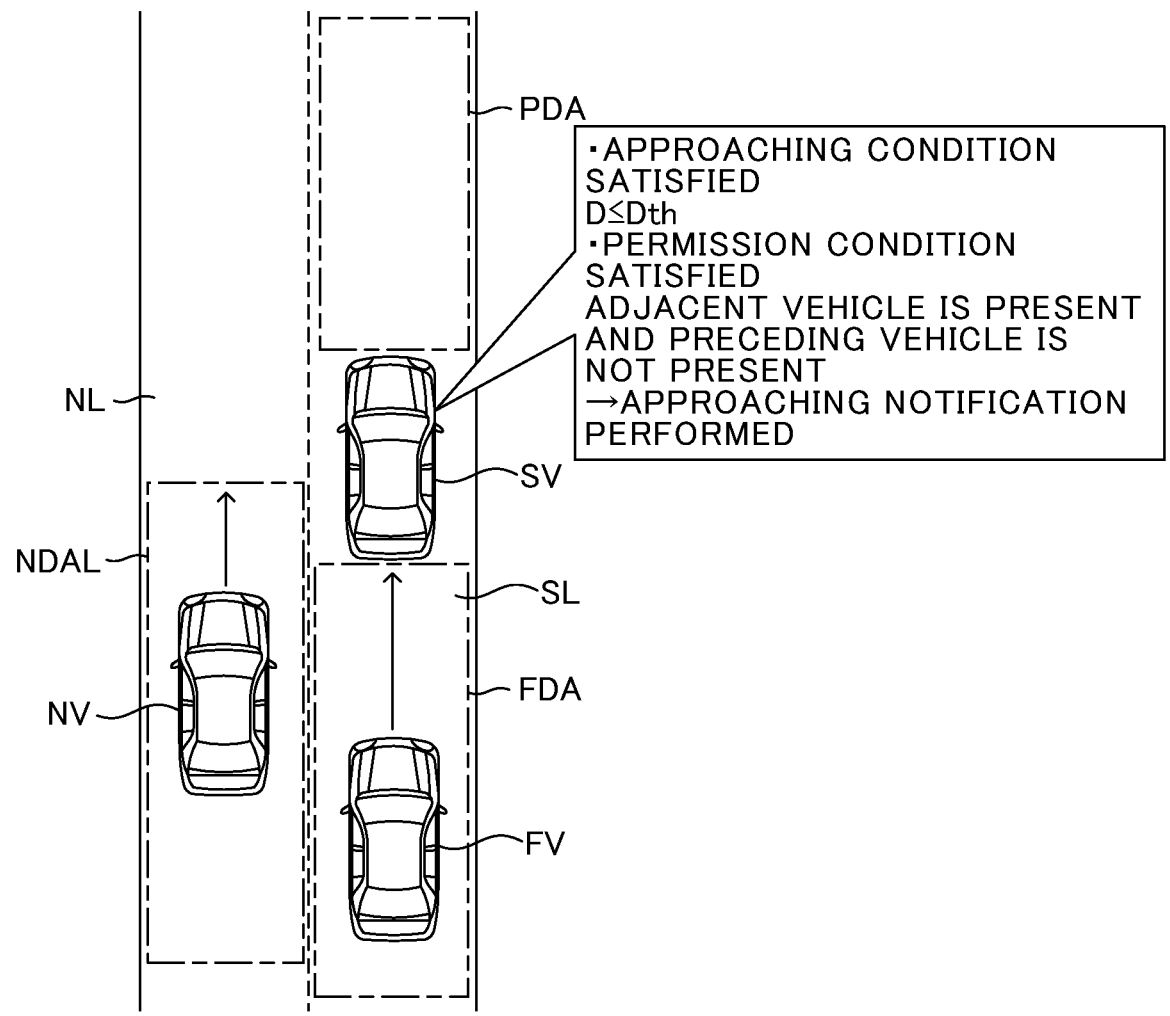
FIG. 5A is a drawing for describing an operation of the driving supporting apparatus, when the adjacent vehicle is present and the preceding vehicle is not present.

In the example shown in FIG. 5A, since a vehicle is present in the leftward adjacent vehicle detection area NDAL, the driving supporting apparatus 10 determines that the adjacent vehicle NV is present. In this case, the driving supporting apparatus 10 determines, based on the object information sent from the forward camera device 22, whether or not a vehicle is present in the preceding vehicle detection area PDA.

In the example shown in FIG. 5A, no vehicle is present in the preceding vehicle detection area PDA (namely, the preceding vehicle PV is not present). In this case, the driving supporting apparatus 10 determines that the permission condition becomes satisfied, and performs the approaching notification.

An example of operation of the driving supporting apparatus 10 under a scene 4 (where the adjacent vehicle NV is present, and the preceding vehicle PV is also present) shown in FIG. 3 will be described, with reference to FIG. 5B.

Figure 5B:
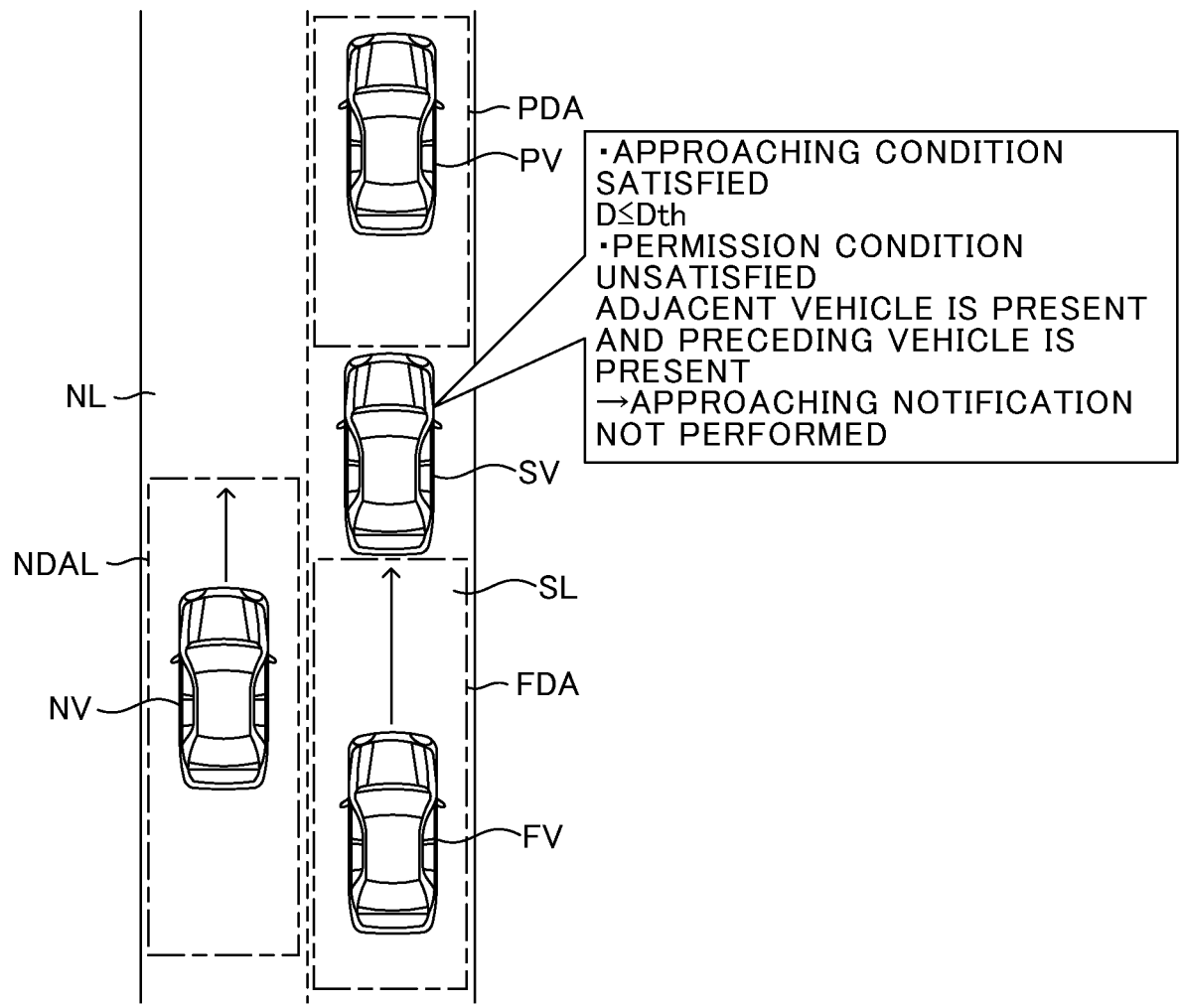
FIG. 5B is a drawing for describing an operation of the driving supporting apparatus, when the adjacent vehicle is present and the preceding vehicle is present.

In the example shown in FIG. 5B, a vehicle is present in the leftward adjacent vehicle detection area NDAL (i.e., the adjacent vehicle NV is present), and a vehicle is present in the preceding vehicle detection area PDA (i.e., the preceding vehicle PV is present). In this case, the driving supporting apparatus 10 determines that the permission condition is not satisfied, and does not perform the approaching notification.

(Specific Operation)

<Approaching Notification Control Routine>

The CPU of the DSECU 20 (hereinafter, the "CPU" means the CPU of the DSECU 20 unless otherwise specified) is configured or programmed to execute an approaching notification control routine shown by a flowchart in FIG. 6 every time a predetermined time elapses.

Figure 6:
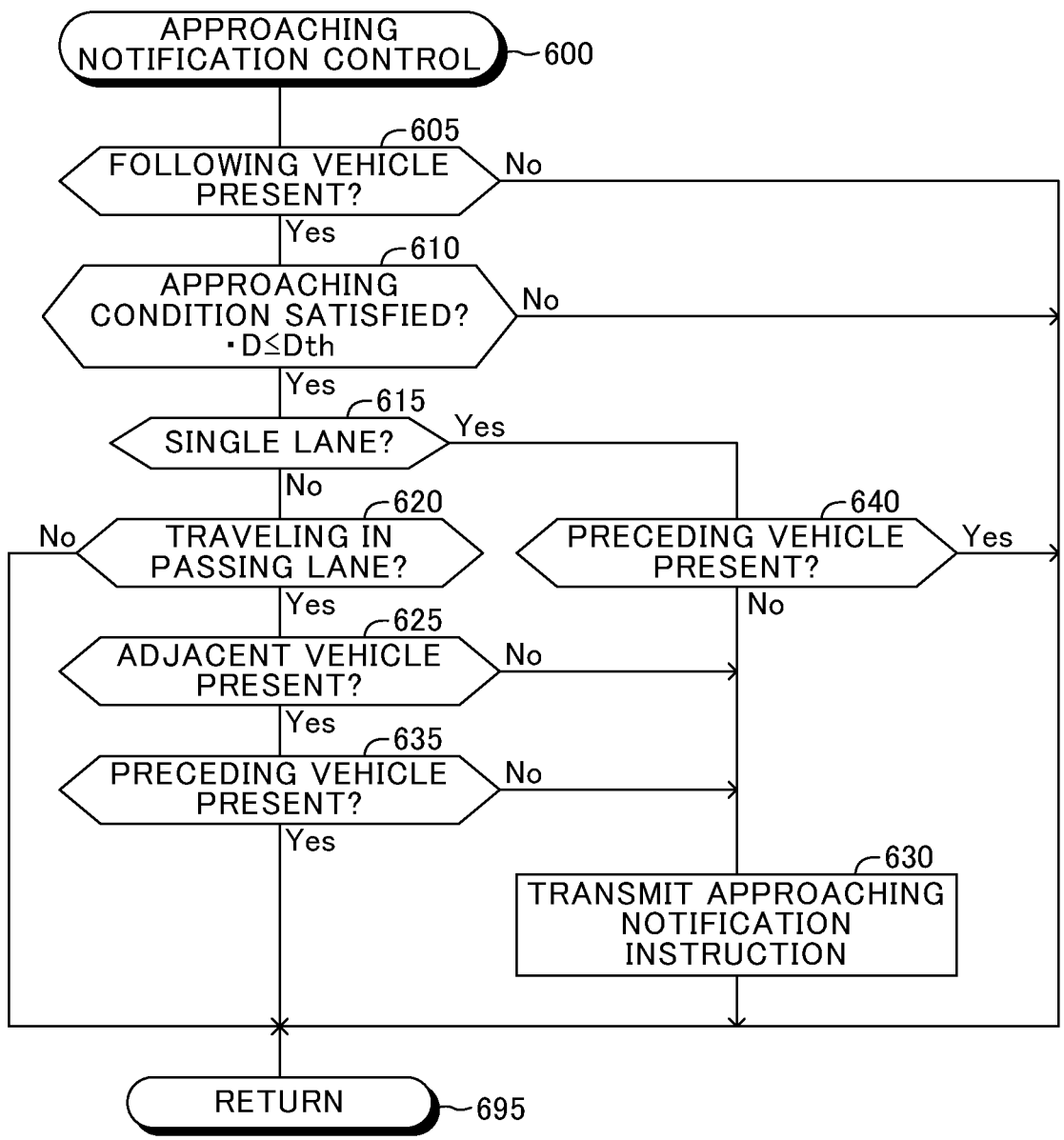
FIG. 6 is a flowchart illustrating an approaching notification control routine executed by a CPU of a driving supporting ECU shown in FIG. 1.

When an appropriate time point comes, the CPU starts processing from step 600 in FIG. 6, and proceeds to step 605. At step 605, the CPU determines, based on the radar object information from the rearward millimeter wave radar devices 24L and 24R, a vehicle (following vehicle FV) is present in the following vehicle detection area FDA.

When the following vehicle FV is not present, the CPU makes a "No" determination at step 605, and proceeds to step 695 to terminate the present routine tentatively. In this manner, when the following vehicle FV is not present, the approaching notification is not performed.

Whereas, when the following vehicle FV is present, the CPU makes a "Yes" determination at step 605, and proceeds to step 610. At step 610, the CPU determines whether or not the approaching condition becomes satisfied (namely, determines whether or not the distance D between the host vehicle SV and the the following vehicle FV is equal to or shorter than the distance threshold Dth).

When the approaching condition is not satisfied, the CPU makes a "No" determination at step 610, and proceeds to step 695 to terminate the present routine tentatively. In this manner, when the approaching condition is not satisfied, the approaching notification is not performed.

Whereas, when the approaching condition is satisfied, the CPU makes a "Yes" determination at step 610, and proceeds to step 615. At step 615, the CPU determines, based on the partition line information, whether or not the host lane SL is the single lane.

When the host lane SL is not the single lane, the CPU makes a "No" determination at step 615, and proceeds to step 620. At step 620, the CPU determines whether or not the host lane SL is the passing lane.

When the host lane SL is not the passing lane but is the cruising lane, the CPU makes a "No" determination at step 620, and proceeds to step 695 to terminate the present routine tentatively. Namely, when the host vehicle SV is traveling in the cruising lane, the approaching notification is not performed even if the approaching condition becomes satisfied.

When the host lane SL is the passing lane, the CPU makes a "Yes" determination at step 620, and proceeds to step 625. At step 625, the CPU determines, based on the radar object information form the left rearward millimeter wave radar device 24L, whether or not the adjacent vehicle NV is present. It should be noted that, in the country where a vehicle must keep right, the CPU determines, based on the radar object information form the right rearward millimeter wave radar device 24R, whether or not the adjacent vehicle NV is present.

When the adjacent vehicle NV is not present, the CPU determines that the permission condition becomes satisfied (refer to the scenes 1 and 2 shown in FIG. 3, refer to FIGS. 4A and 4B). In this case, the CPU makes a "No" determination at step 625, and proceeds to step 630. At step 630, the CPU transmits the approaching notification instruction to the display 31. Thereafter, the CPU proceeds to step 695 to terminate the present routine tentatively.

Whereas, if the adjacent vehicle NV is present when the CPU proceeds to step 625, the CPU makes a "Yes" determination at step 625, and proceeds to step 635. At step 635, the CPU determines, based on the object information from the forward camera device 22, whether or not the preceding vehicle PV is present.

When the preceding vehicle PV is not present, the CPU determines that the permission condition becomes satisfied (refer to the scene 3 shown in FIG. 3, refer to FIG. 5A). In this case, the CPU makes a "No" determination at step 635, and proceeds to step 630 so as to transmit the approaching notification instruction to the display 31. Thereafter, the CPU proceeds to step 695 to terminate the present routine tentatively.

Whereas, if the preceding vehicle PV is present when the CPU proceeds to step 635, the CPU determines that the permission condition is not satisfied (refer to the scene 4 shown in FIG. 3, refer to FIG. 5B). In this case, the CPU makes a "Yes" determination at step 635, and proceeds to step 695 to terminate the present routine tentatively.

If the host lane SL is the single lane when the CPU proceeds to step 615, the CPU makes a "Yes" determination at step 615, and proceeds to step 640. At step 640, the CPU determines, based on the object information from the forward camera device 22, whether or not the preceding vehicle PV is present.

When the preceding vehicle PV is not present, the CPU makes a "No" determination at step 640, and proceeds to step 630 so as to transmit the approaching notification instruction to the display 31. Thereafter, the CPU proceeds to step 695 to terminate the present routine tentatively. When the host vehicle SV is traveling in the single lane and the preceding vehicle PV is not present, the driver can take an action to accelerate the host vehicle with respect to the following vehicle FV. Therefore, when the host vehicle SV is traveling in the single lane and the preceding vehicle PV is not present, the approaching notification is performed.

When the preceding vehicle PV is present, the CPU makes a "Yes" determination at step 640, and proceeds to step 695 to terminate the present routine tentatively. When the host vehicle SV is traveling in the single lane and the preceding vehicle PV is present, the driver cannot take any actions with respect to the following vehicle FV. Therefore, when the host vehicle SV is traveling in the single lane and the preceding vehicle PV is present, the approaching notification is not performed.

The driving supporting apparatus 10 has set the permission condition in such a manner that the permission condition used when the adjacent vehicle NV is present is harder to be satisfied than the permission condition used when the adjacent vehicle NV is not present. Therefore, the possibility that the approaching notification is performed in a scene where the driver cannot take any actions with respect to the following vehicle FV can be decreased. Accordingly, the possibility that the driver feels annoyed by the approaching notification can also be reduced.

The present disclosure should not be limited to the above-described embodiment, and may employ various modifications within the scope of the present disclosure.

(First Modification)

The driving supporting apparatus 10 according to a first modification determines whether or not the preceding vehicle PV is present when the adjacent vehicle NV is not present. When neither the adjacent vehicle NV nor the preceding vehicle PV is present (refer to the scene 1 shown in FIG. 3, and FIG. 4A), the driving supporting apparatus 10 performs the approaching notification if the vehicle speed Vs is equal to or lower than a predetermined vehicle speed threshold Vsth. In the scene 1 shown in FIG. 3, the driving supporting apparatus 10 performs a lane change notification to urge the driver to change lanes to the adjacent lane NL for the following vehicle FV (to pass the host vehicle SV), if the vehicle speed Vs is higher than the vehicle speed threshold Vsth.

When neither the adjacent vehicle NV nor the preceding vehicle PV is present, the driver can select, as an action with respect to the following vehicle FV, either causing the host vehicle SV to change lanes or accelerating the host vehicle SV. When the vehicle speed Vs is higher than the vehicle speed threshold Vsth, it is likely that it is inappropriate that the driver accelerates the host vehicle SV. In view of this, when neither the adjacent vehicle NV nor the preceding vehicle PV is present and the vehicle speed Vs is higher than the vehicle speed threshold Vsth, the driving supporting apparatus 10 performs the lane change notification.

Figure 7:
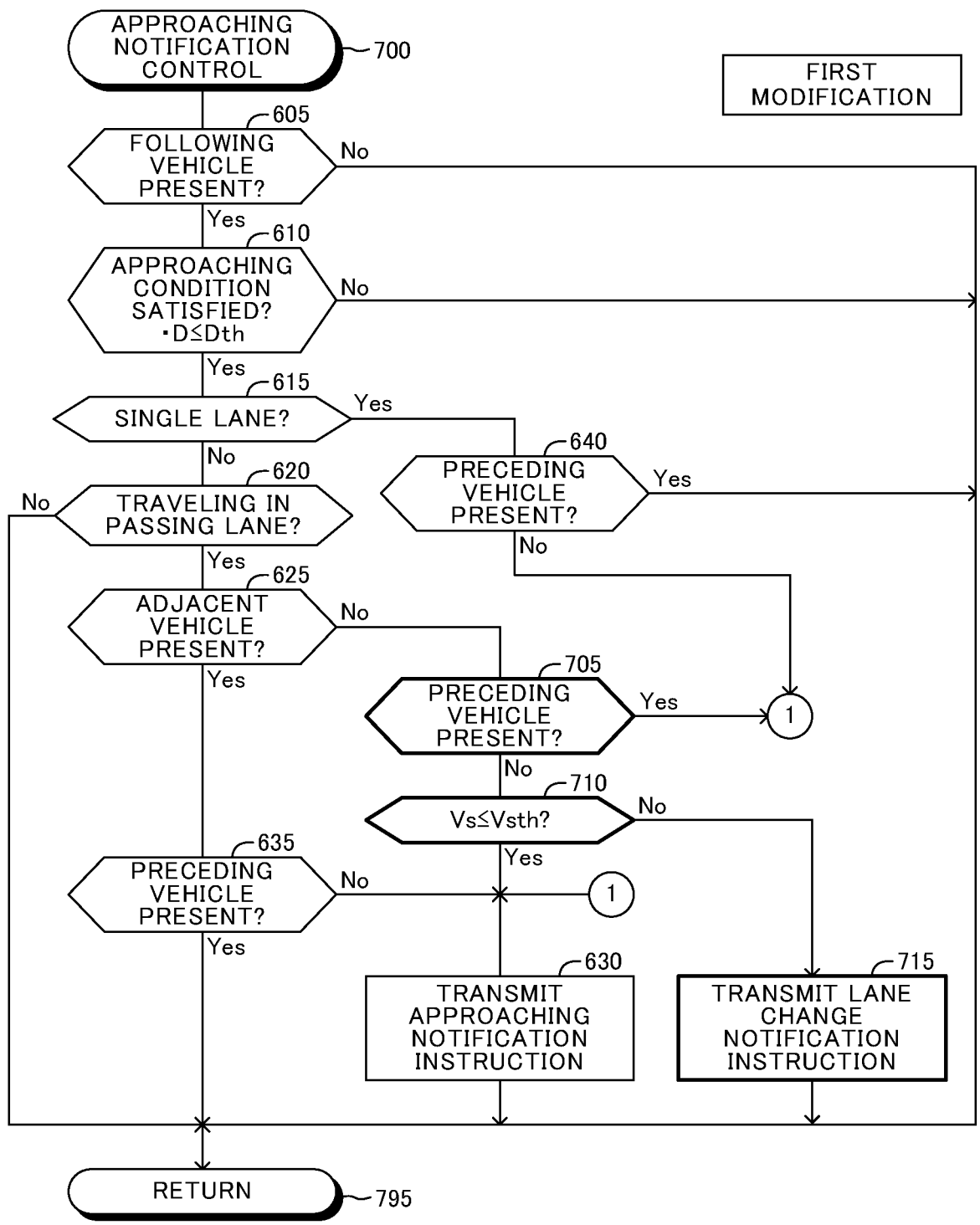
FIG. 7 is a flowchart illustrating an approaching notification control routine executed by a CPU of a driving supporting ECU according to a first modification of the present disclosure.

The CPU of the DSECU 20 of the first modification is configured or programmed to execute an approaching notification control routine shown in FIG. 7 in place of the approaching notification control routine shown in FIG. 6, every time a predetermined time elapses. A step shown in FIG. 7 for executing the same process as the process of the step shown in FIG. 6 is provided with the same reference as one used for that step shown in FIG. 6, and will not be described.

<Approaching Notification Control Routine>

When an appropriate time point comes, the CPU starts processing from step 700, and proceeds to step 605 shown in FIG. 7. When the following vehicle FV is present, the CPU makes a "Yes" determination at step 605 shown in FIG. 7, and proceeds to step 610 shown in FIG. 7. When the approaching condition is satisfied, the CPU makes a "Yes" determination at step 610 shown in FIG. 7, and proceeds to step 615 shown in FIG. 7.

When the host lane SL is not the single lane, the CPU makes a "No" determination at step 615 shown in FIG. 7, and proceeds to step 620 shown in FIG. 7. When the host lane SL is the passing lane, the CPU makes a "Yes" determination at step 620 shown in FIG. 7, and proceeds to step 625 shown in FIG. 7. When the adjacent vehicle NV is not present, the CPU makes a "No" determination at step 625 shown in FIG. 7, and proceeds to step 705.

At step 705, the CPU determines whether or not the preceding vehicle PV is present.

When the preceding vehicle PV is present, the CPU makes a "Yes" determination at step 705, and proceeds to step 630 shown in FIG. 7. At step 630, the CPU transmits the approaching notification instruction to the display 31. Thereafter, the CPU proceeds to step 795 to terminate the present routine tentatively.

When the preceding vehicle PV is not present, the CPU makes a "No" determination at step 705, and proceeds to step 710. At step 710, the CPU determines whether or not the vehicle speed Vs is equal to or lower than the vehicle speed threshold Vsth.

When the vehicle speed Vs is equal to or lower than the vehicle speed threshold Vsth, the CPU makes a "Yes" determination at step 710, and proceeds to step 630 shown in FIG. 7 so as to transmit the approaching notification instruction to the display 31. Thereafter, the CPU terminates the present routine tentatively.

When the vehicle speed Vs is higher than the vehicle speed threshold Vsth, the CPU makes a "No" determination at step 710, and proceeds to step 715. At step 715, the CPU transmits a lane change notification instruction to the display 31. Thereafter, the CPU proceeds to step 795 to terminate the present routine tentatively. When the display 31 receives the lane change notification instruction, the display 31 displays a lane change notification image. The lane change notification image is for notifying the driver of the host vehicle SV that changing lanes is necessary since the following vehicle FV has approached.

In this manner, when neither the adjacent vehicle NV nor the preceding vehicle PV is present and the vehicle speed Vs is higher than the vehicle speed threshold Vsth, the driving supporting apparatus 10 performs the lane change notification. This can prevent the driver from accelerating the host vehicle SV when the host vehicle SV is running at a relatively high speed, and thus, can let the driver take an appropriate action with respect to the following vehicle FV without dithering what to do (immediately).

(Second Modification)

The driving supporting apparatus 10 according to a second modification performs an acceleration notification for urging the driver of the host vehicle SV because of the approach of the following vehicle FV, when the preceding vehicle PV is not present and the vehicle speed Vs is equal to or lower than the vehicle speed threshold Vsth.

When the preceding vehicle PV is not present and the vehicle speed Vs is relatively low, it is appropriate that the driver accelerates the host vehicle SV as an action with respect to the following vehicle FV. Since the driving supporting apparatus 10 according to the second modification performs the acceleration notification, the apparatus 10 can increase a possibility that the driver of the host vehicle SV takes an appropriate action with respect to the following vehicle FV. This can decrease the possibility that the driver of the following vehicle feels stress about the host vehicle SV, and can further decrease the possibility that the traffic congestion occurs.

Figure 8:
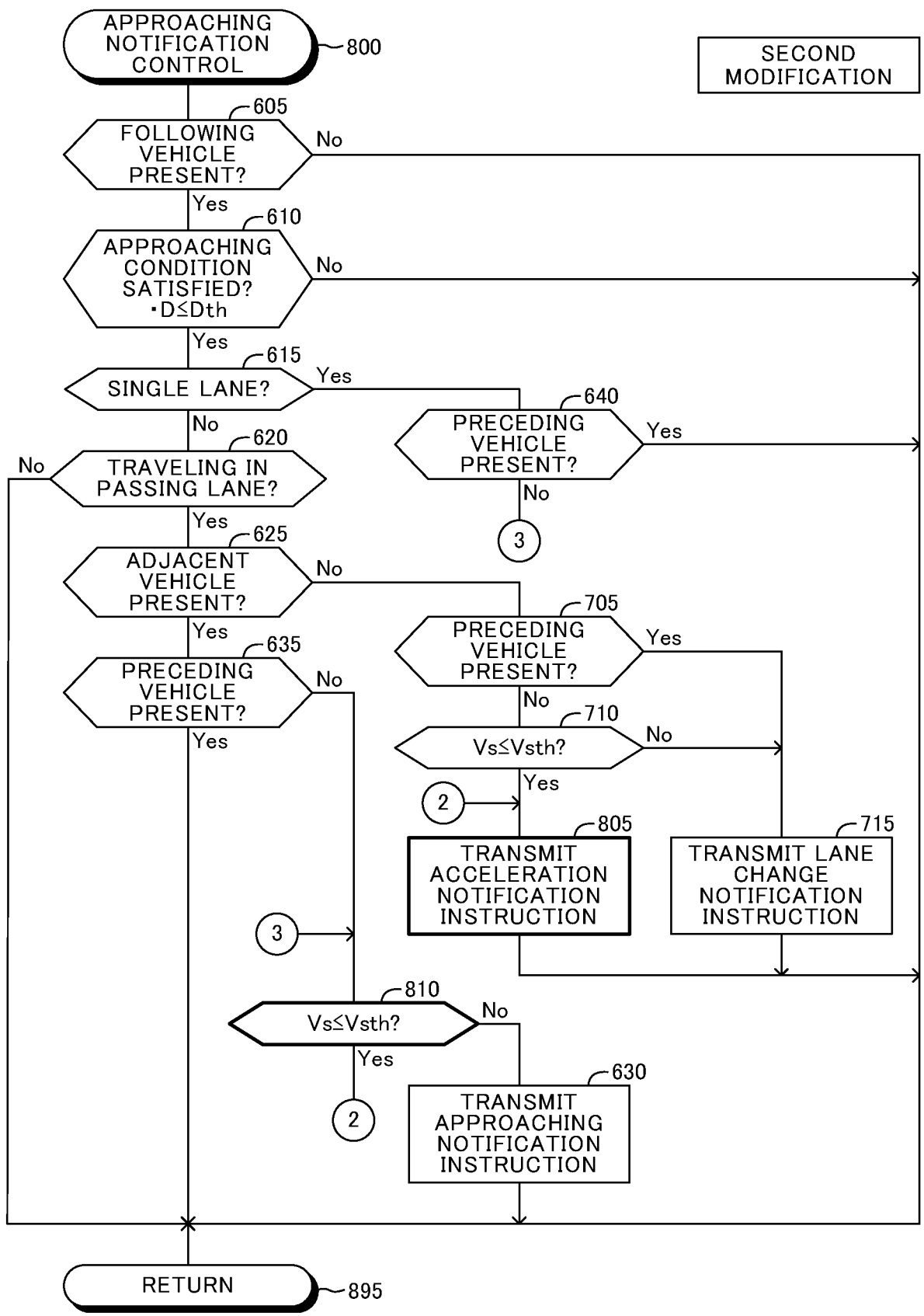
FIG. 8 is a flowchart illustrating an approaching notification control routine executed by a CPU of a driving supporting ECU according to a second modification of the present disclosure.

The CPU of the DSECU 20 of the second modification is configured or programmed to execute an approaching notification control routine shown in FIG. 8 in place of the approaching notification control routine shown in FIG. 7, every time a predetermined time elapses. A step shown in FIG. 8 for executing the same process as the process of the step shown in FIG. 7 is provided with the same reference as one used for that step shown in FIG. 7, and will not be described.

<Approaching Notification Control Routine>

When an appropriate time point comes, the CPU starts processing from step 800. The CPU proceeds to step 625 shown in FIG. 8, when the following vehicle FV is present ("Yes" at step 605 shown in FIG. 8), the approaching condition is satisfied ("Yes" at step 610 shown in FIG. 8), when the host lane SL is not the single lane ("No" at step 615 shown in FIG. 8), and when the host lane SL is the passing lane ("Yes" at step 620 shown in FIG. 8).

The CPU proceeds to step 805, when the adjacent vehicle NV is not present ("No" at step 625 shown in FIG. 8), the preceding vehicle PV is not present ("Yes" at step 705 shown in FIG. 8), and the vehicle speed Vs is equal to or lower than the vehicle speed threshold Vsth ("Yes" at step 710 shown in FIG. 8).

At step 805, the CPU transmits an acceleration notification instruction to the display 31, and proceeds to step 895 to terminate the present routine tentatively. When the display 31 receives the acceleration notification instruction, the display 31 displays an acceleration notification image. The acceleration notification image is for notifying the driver of the host vehicle SV that accelerating the host vehicle SV is necessary since the following vehicle FV has approached.

If the vehicle speed Vs is higher than the vehicle speed threshold Vsth when the CPU proceeds to step 710 shown in FIG. 8, the CPU makes a "No" determination at step 710 shown in FIG. 8, and proceeds to step 715 shown in FIG. 8 so as to transmit the lane change notification instruction to the display 31. Thereafter, the CPU proceeds to step 895 to terminate the present routine tentatively.

If the preceding vehicle PV is present when the CPU proceeds to step 705 shown in FIG. 8, the CPU makes a "Yes" determination at step 705 shown in FIG. 8, and proceeds to step 715 shown in FIG. 8 so as to transmit the lane change notification instruction to the display 31.

If the adjacent vehicle NV is present when the CPU proceeds to step 625 shown in FIG. 8, the CPU makes a "Yes" determination at step 625 shown in FIG. 8, and proceeds to step 635 shown in FIG. 8. If the preceding vehicle PV is present, the CPU makes a "Yes" determination at step 635 shown in FIG. 8, and proceeds to step 895 to terminate the present routine tentatively. If the preceding vehicle PV is not present, the CPU makes a "No" determination at step 635 shown in FIG. 8, and proceeds to step 810.

At step 810, the CPU determines whether or not the vehicle speed Vs is equal to or lower than the vehicle speed threshold Vsth. When the vehicle speed Vs is equal to or lower than the vehicle speed threshold Vsth, the CPU makes a "Yes" determination at step 810, and proceeds to step 805 so as to transmit the acceleration notification instruction to the display 31. Thereafter, the CPU proceeds to step 895 to terminate the present routine tentatively.

When the vehicle speed Vs is higher than the vehicle speed threshold Vsth, the CPU makes a "No" determination at step 810, and proceeds to step 630 shown in FIG. 8 so as to transmit the approaching notification instruction to the display 31. Thereafter, the CPU proceeds to step 895 to terminate the present routine tentatively.

If the host lane SL is the passing lane when the CPU proceeds to step 615 shown in FIG. 8, the CPU makes a "Yes" determination at step 615 shown in FIG. 8, and proceeds to step 640 shown in FIG. 8. When the preceding vehicle PV is present, the CPU makes a "Yes" determination at step 640 shown in FIG. 8, and proceeds to step 895 to terminate the present routine tentatively.

When the preceding vehicle PV is not present, the CPU makes a "No" determination at step 640 shown in FIG. 8, and proceeds to step 810. When the vehicle speed Vs is equal to or lower than the vehicle speed threshold Vsth ("Yes" at step 810), the CPU transmits the acceleration notification instruction to the display 31. When the vehicle speed Vs is higher than the vehicle speed threshold Vsth ("No" at step 810), the CPU transmits the approaching notification instruction to the display 31.

In this manner, the approaching notification is performed, when the preceding vehicle PV is not present ("No" at step 705 shown in FIG. 8, "No" at step 635 shown in FIG. 8, "No" at step 640 shown in FIG. 8), and the vehicle speed Vs is equal to or lower than the vehicle speed threshold Vsth ("Yes" at step 710 shown in FIG. 8, "Yes" at step 810). This can increase the possibility that the driver of the host vehicle SV can take an appropriate action with respect to the following vehicle FV.

The second modification described above is based on the first modification configured to perform the lane change notification, however, the second modification can be applied to the above-described embodiment that does not the lane change notification. More specifically, the CPU may be configured to execute the process of step 630 shown in FIG. 8 in place of the process of step 715 shown in FIG. 8, when the CPU makes a "Yes" determination at 705 shown in FIG. 8 or when the makes a "No" determination at step 710 shown in FIG. 8.

(Third Modification)

The driving supporting apparatus 10 according to a third modification sets the speed threshold Vsth, used in the first and second modifications, to a speed limit Vlmt applied to a present position of the host vehicle SV in the host lane SL.

The GNSS receiver 25 shown in FIG. 1 is a device that receives positioning signals transmitted from Global Navigation Satellites. The DSECU 20 specifies, based on the positioning signals received by the GNSS receiver 25, the present position (represented by a latitude and a longitude) of the host vehicle SV.

The storage device 26 shown in FIG. 1 is an involatile memory into which the DSECU 20 can write data, and from which the DSECU 20 can read data. For example, the storage device 26 is a hard disc drive. However, the storage device 26 should not be limited to a hard disc drive, and may be any well-known writable and readable storage devices or well-known writable and readable storage mediums. The storage device 26 includes a map data storage section 26a storing map data. In the map data, a position and a speed limit Vlmt applied to the position are associated with each other and stored.

The CPU of the DSECU 20 according to the third modification specifies the present position of the host vehicle SV, every time the CPU starts the approaching notification control routine shown in FIG. 7 or FIG. 8, and obtains the speed limit Vlmt corresponding to the present position. Thereafter, the CPU sets the vehicle speed threshold Vsth to the obtained speed limit Vlmt.

(Fourth Modification)

In the above-described embodiment, the driving supporting apparatus 10 performs the approaching notification when the host vehicle SV is traveling in the passing lane, however, the driving supporting apparatus 10 according to a fourth modification performs the approaching notification when the host vehicle SV is traveling not only in the passing lane but also in the cruising lane.

(Fifth Modification)

In the above-described embodiment, the approaching condition is the condition that the distance D between the host vehicle SV and the following vehicle FV is equal to or shorter than the distance threshold Dth, however, the approaching condition should not be limited to this condition. For example, the approaching condition may be a condition to be satisfied when a time to collision TTC that is a time (time length) for the following vehicle FV (to take) to collide with the host vehicle SV is equal to or shorter than a predetermined time threshold. The driving supporting apparatus 10 obtains the time to collision by dividing the distance D by the relative speed Vr of the following vehicle FV.

(Sixth Modification)

In the above-described embodiment, the display 31 performs the approaching notification, the lane change notification, and the acceleration notification, however, the speaker 32 may perform at least one of these notifications. The speaker 32 is a device that generate a sound in the cabin of the host vehicle SV.

The speaker 32 generates an audio message indicating that the following vehicle FV has approached when the speaker 32 receives the approaching notification instruction.

The speaker 32 generates an audio message indicating that changing lanes is necessary since the following vehicle FV has approached when the speaker 32 receives the lane change notification instruction.

The speaker 32 generates an audio message indicating that accelerating the host vehicle SV is necessary since the following vehicle FV has approached when the speaker 32 receives the acceleration notification instruction.

It should be noted that the display 31 and the speaker 32 may be expressed as a notification device.

(Seventh Modification)

The leftward adjacent vehicle detection area NDAL and the rightward adjacent vehicle detection area NDAR should not be limited to the areas shown FIG. 2. For example, if a millimeter wave radar device (or a camera device) configured to be able to an object present in a left side area of the host vehicle SV and in a left forward area of the host vehicle SV is installed in the host vehicle SV, the leftward adjacent vehicle detection area may include not only the leftward adjacent vehicle detection area NDAL located rear leftward of the host vehicle SV but also "the left side area and the left forward area" of the host vehicle SV. Similarly, if a millimeter wave radar device (or a camera device) configured to be able to an object present in a right side area of the host vehicle SV and in a right forward area of the host vehicle SV is installed in the host vehicle SV, the rightward adjacent vehicle detection area may include not only the rightward adjacent vehicle detection area NDAR located rear rightward of the host vehicle SV but also "the right side area and the right forward area" of the host vehicle SV.

(Eighth Modification)

The millimeter wave radar devices 23, 24L and 24R may be replaced with a remote sensing device that is capable of detecting an object by radiating a radio wave other than the millimeter wave and receiving its reflected wave. In addition, the number of the millimeter wave radar devices installed in the host vehicle SV should not be limited to the number of them shown in FIG. 1. Furthermore, if the forward camera device 22 is able to detect a position of an object present in front of the host vehicle SV accurately, the forward millimeter wave radar device 23 may not have to be installed in the host vehicle SV. A camera device (or rear camera devices) may be installed in the host vehicle SV in place of the left rearward millimeter wave radar device 24L and the right rearward millimeter wave radar device 24R.

(Ninth Modification)

The driving supporting apparatus 10 may be applied not only to the above-described host vehicle with an internal combustion engine, but also to a hybrid electric vehicle (HEV), a plug-in hybrid electric vehicle (PHEV), a fuel cell electric vehicle (FCEV), and a battery electric vehicle (BEV).

What is claimed is:

1. A driving supporting apparatus comprising:
    a notification device that performs a notification to a driver of a host vehicle; and
    a control unit capable of causing said notification device to perform an approaching notification to notify said driver that a following vehicle present behind said host vehicle has approached said host vehicle, when said following vehicle satisfies a predetermined approaching condition, wherein,
said control unit is configured to cause said notification device to perform said approaching notification, when said following vehicle satisfies said approaching condition in a case where an adjacent lane is present, said adjacent lane being a lane that is adjacent to a host lane in which said host vehicle is traveling and that permits vehicles to travel in the same direction as a direction in which said host lane permits vehicles to travel, if a permission condition depending on presence or absence of an adjacent vehicle traveling in said adjacent lane is satisfied, and wherein,
said permission condition used when said adjacent vehicle is present has been set to a condition that is harder to be satisfied than a condition set as said permission condition used when said adjacent vehicle is not present.

2. The driving supporting apparatus according to claim 1, wherein,
said permission condition has been set in such a manner that:
    said permission condition is satisfied regardless of whether or not a preceding vehicle in front of said host vehicle is present, if said adjacent vehicle is not present, and
    said permission condition is satisfied when said preceding vehicle is not present if said adjacent vehicle is present, and
    said permission condition is not satisfied when said preceding vehicle is present if said adjacent vehicle is present.

3. The driving supporting apparatus according to claim 2, wherein,
said control unit is configured to, when neither said adjacent vehicle nor said preceding vehicle is present in a case where said permission condition is satisfied, differentiate between a manner of said approaching notification of when a vehicle speed indicative of a speed of said host vehicle is higher than a predetermined vehicle speed threshold and a manner of said approaching notification of when said vehicle speed is equal to or lower than said vehicle speed threshold.

4. The driving supporting apparatus according to claim 3, wherein, said control unit is configured to, when neither said adjacent vehicle nor said preceding vehicle is present in said case where said permission condition is satisfied:
    cause said notification device to perform, as said approaching notification, a lane change notification having a manner to urge said driver to change lanes to said adjacent lane, when said vehicle speed is higher than said vehicle speed threshold; and
    cause said notification device to perform, as said approaching notification, a notification having a manner to notify said driver that said following vehicle has approached, when said vehicle speed is equal to or lower than said vehicle speed threshold.

5. The driving supporting apparatus according to claim 2, wherein,
said control unit is configured to, when said preceding vehicle is not present in a case where said permission condition is satisfied, cause said notification device to perform, as said approaching notification, an acceleration notification having a manner to urge said driver to accelerate said host vehicle, when a vehicle speed indicative of a speed of said host vehicle is equal to or lower than a predetermined vehicle speed threshold.

6. The driving supporting apparatus according to claim 1, wherein, said control unit is configured to determine that said approaching condition becomes satisfied, when a distance between said host vehicle and said following vehicle becomes equal to or shorter than a predetermined distance threshold, or when a time length predicted for said following vehicle to collide with said host vehicle becomes equal to or shorter than a predetermined time threshold.

* * * * *